455-519
54819    AU 263    EX
         XR    4,465,907

United States Patent [19]
Minear et al.

[11] Patent Number: 4,465,907
[45] Date of Patent: Aug. 14, 1984

[54] HEADSET RECEIVER AND SANITIZING STORAGE SYSTEM THEREFOR

[75] Inventors: Ronald J. Minear, Huntington Beach; Harvey F. Brion, Mission Viejo; William H. Terbrack, Irvine, all of Calif.

[73] Assignee: Hughes Aircraft Company, El Segundo, Calif.

[21] Appl. No.: 354,101

[22] Filed: Mar. 2, 1982

[51] Int. Cl.³ .......................... H04M 1/05; H04B 9/00
[52] U.S. Cl. ............................ 179/156 R; 179/156 A; 179/178; 179/185; 134/84; 381/86; 455/99; 455/347
[58] Field of Search ............... 179/185, 156 A, 156 R, 179/157, 107 R, 178, 179, 1 ST, 1 VE; 455/98, 455/99, 100, 344, 345, 346, 347, 349, 351; 134/84, 134/92; 312/9, 10; 381/67,86

[56] References Cited

U.S. PATENT DOCUMENTS

| 3,250,283 | 5/1966 | Reinfeld | 134/92 |
| 3,885,987 | 5/1975 | Keister et al. | 134/6 |
| 4,229,829 | 10/1980 | Grunwald | 455/600 |

FOREIGN PATENT DOCUMENTS 885830  11/1971  Canada ............................. 134/84

OTHER PUBLICATIONS

Sennheiser Review, Aug. 1977, p. 77.

Primary Examiner—Gene Z. Rubinson
Assistant Examiner—Danita R. Byrd
Attorney, Agent, or Firm—Lewis B. Sternfels; A. W. Karambelas

[57] ABSTRACT

The combination of headset receivers (10) and storage system (50) therefor is used in an aircraft passenger entertainment system. Each receiver comprises a housing (12) including electronics for receiving infrared wireless transmission, which is converted into audible signals and supplied to a listener's ears through stems (14). Storage of the receivers is in a case (56, 58, 72) having grid plates (74, 76) and a slitted sanitizing pad (78), for receiving and storing the receivers, and for sanitizing their housings and stems.

27 Claims, 6 Drawing Figures

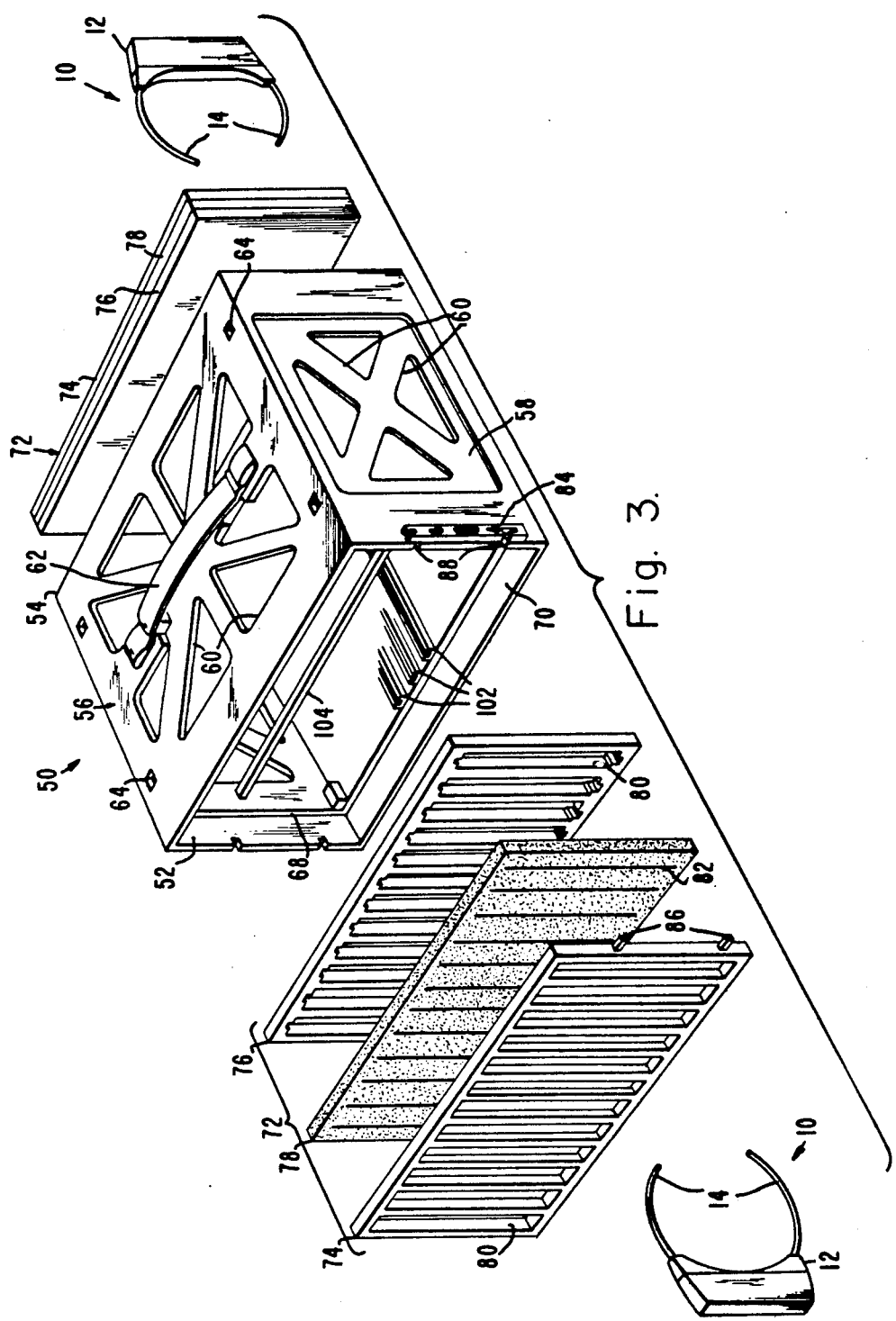

HEADSET RECEIVER AND SANITIZING STORAGE SYSTEM THEREFOR

BACKGROUND OF THE INVENTION

1. Field of the Invention

The present invention relates to a headset receiver and apparatus and a method for enabling its reuse by a plurality of listeners and, in particular, to a sanitizing storage system and method for such receivers.

2. Description of the Prior Art

While the present invention is particularly adapted for use in aircraft passenger entertainment systems, it is to be understood that its use is as applicable for listeners in any environment. However, because the invention was devised specifically for aircraft passenger entertainment systems, the ensuing discussion and description will be specific thereto.

The existing passenger entertainment system on aircraft utilizes acoustical headsets, which are plugged into a mating receptacle in individual seat arms. The acoustical signal is derived from various electronic components, including a control unit in the passenger's seat arm, an electronics box at the seat, and other electronic hardware elsewhere on the airplane.

It is generally agreed among users of the existing acoustical headsets that they are cumbersome because the headset must be connected to the seat arm, that they have relatively poor sound reproduction because of the extreme length of the acoustical tubing, and that they have an inherently uncomfortable fit. However, they are relatively inexpensive so that, after they are retrieved after each flight, they may be discarded or, if desired, cleaned and returned to the next user. The low cost of the existing acoustical headsets, however, is more than compensated for by the high cost of that electronic equipment which is in the seat and the cost of the installation therein and repair thereof. In addition, existing hardware adds between 250 pounds and 350 pounds to airborne vehicles.

SUMMARY OF THE INVENTION

The present invention avoids and overcomes these and other disadvantages or problems by adapting existing wireless transmission, preferably infrared transmission, to such entertainment systems.

Specifically, in the invention a headset receiver contains all the electronics for receiving the wireless transmission and for converting it into an audible signal which is then supplied to the listener's ears. To enable its reuse by other passengers, the headset receiver is retrieved by a flight attendant and placed in a specially designed case which is capable not only of storing a plurality of similar headsets but also of sanitizing them, so that the headsets may be retained on board the aircraft, without needing to be laundered at some offboard location.

Various means of retrieval may be employed, such as by collecting headsets from each passenger at his seat or at the door, or by the use of a detector of the type used to prevent pilferage of clothing and the like from stores.

Attached to the receiver are a pair of acoustical stems with conventional replaceable earpads which, when placed against the listener's ears, supports the headset receiver. Thus, the length of the acoustical stems is held to a minimum and thereby permits the sound reproduction to be improved over that obtained by use of conventional acoustical tubing. Electrical power to such a receiver can be provided by a single 1.5 volt AA battery, which is fittable within a recessed opening within the housing of the receiver. Thus, it is necessary only to provide replaceable earpads and a battery to assure the passenger of a fresh, clean unit, after it has been stored within and removed from the storage and sanitizing case.

Included also within the receiver housing are recessed openings for channel and volume controls so that the receiver unit is entirely self-contained.

To enable insertion of the headset receiver in its storage container, its housing preferably has a thin configuration, and the carrying case has a slotted entry through which the thin housing can be slid. Behind the slots is a slitted foam pad which is impregnated with a sanitizing fluid so that each headset receiver, when inserted through the slots and the foam pad, is automatically wiped with the sanitizing fluid. The case is constructed to enable replacement of the foam pads upon depletion of the sanitizing fluid.

Several advantages follow from the above system. The carrying and storage case provides an accurate method of headset accountability. The headsets are automatically sanitized as a normal occurrence during their insertion or withdrawal from storage case. The headsets can be used and reused on board on a single aircraft, thereby eliminating the need for frequent resupply. The foam sanitizing pad can be replaced with a minimum of effort and without the need for tools. Packaging density is maximized.

The headset receiver design itself provides several advantages. It uses a wireless transmission and reception and, therefore, eliminates any connections to the arm of the seat. The shortness of the stems not only improves the quality of sound to the passenger's ears but also is more easily shapable to ensure a comfortable fit. The smooth exterior not only eliminates snagging and enhances storage within the case, but also has an aesthetically pleasing appearance. It enables the battery to be easily replaced. It also provides facile access to the system controls, that is, it avoids a prior problem of blockage of the seat arm controls by seat trays, blankets and the like. As a corollary, should the unit malfunction, it can be easily replaced and, if desired, repaired away from the seat and the aircraft, thereby increasing the time for which the aircraft would be available. It utilizes fewer parts and, therefore, adds only 60 to 100 pounds to the aircraft, thus saving considerable weight over existing systems and helping to save fuel and the expense thereof.

Other aims and advantages as well as a more complete understanding of the present invention will appear from the following explanation of an exemplary embodiment and the accompanying drawings thereof.

BRIEF DESCRIPTION OF THE DRAWINGS

FIG. 3 is a exploded perspective view of a case used to store, carry and sanitize the headset receivers depicted in FIGS. 1 and 2, with a pair of receivers shown in position for storage in the case;

DETAILED DESCRIPTION OF THE INVENTION

Figure 2:
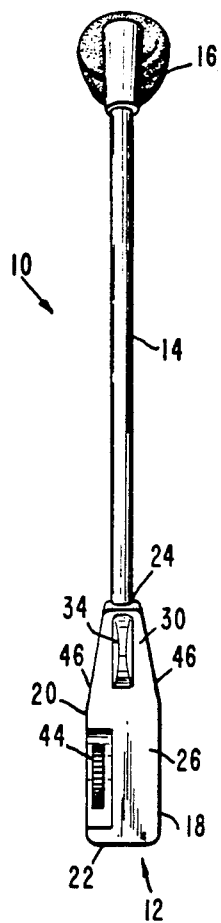
FIG. 2 is a side view of the receiver shown in FIG. 1.
Figure 1:
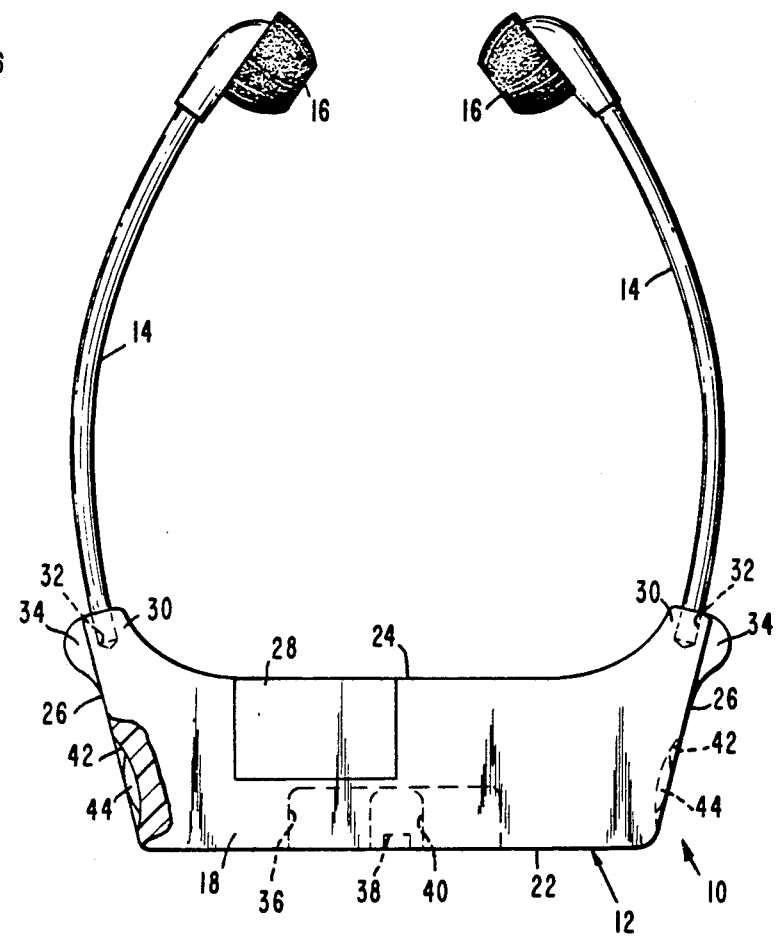
FIG. 1 is a front view of a headset receiver.

As illustrated in FIGS. 1 and 2, a headset receiver 10 includes a housing 12 and a pair of acoustical stems 14. A pair of earpads 16 are replaceably secured to the ends of stems 14 in a conventional manner.

Housing 12 is adapted to receive electromagnetic signals, such as infrared signals, to convert the signals into audible signals and to supply the audible signals to a listener's ears through the stems 14. Electronic circuits for generating and receiving such signals are known in the art. Examples include U.S. Pat. No. 4,299,829 and the reference cited therein, and two publications entitled "Stereo drahtlos" (Wireless Stereo), "Infrarot-Stereo-Kopfhorer" (Infrared Stereo Headphones), appearing in a Swiss publication entitled "radio-tvelectronic", Vol. 37, No. 5, May 1977, pages 67–69, and "Fernsehton uber Infrarotlicht zum kopfhorer oder zur HiFi-Anlage" (Infrared Transmission of Television Sound Channels to Headphones or Hi-Fi Equipment), appearing in an Austrian publication entitled "Radio Elektronik Schau", Vol. 51, No. 9, 1975, pp. 484–486. A similar headphone to that illustrated in the second figure of the latter publication appears in the tenth edition of the Sennheiser Review of Aug. 1979 on pp. 76 and 77 thereof.

Housing 12 is configured generally as a thin parallelepiped whose exterior surfaces include front surface 18, rear surface 20 and edge surfaces comprising base edge surface 22, top edge surface 24 and side edge surfaces 26. Base and top surfaces 22 and 24 are relatively long with respect to side surfaces 26 to impart front and back surfaces 18 and 20 with areas which are relatively large with respect to the areas of the edge surfaces. Such a configuration not only permits easy insertion of the headset into its storage and sanitizing case but also is conveniently configured for the listener's comfort and ease of use. Formed flush with front surface 18 is a cover 28 which covers the detector which senses the electromagnetic signals.

Extending from top surface 24 at its juncture with side surfaces 26, are a pair of ears 30 having openings 32 therein for reception of acoustical stems 14. Also extending outwardly from ears 30 are a pair of guide tabs 34 which enable receiver 10 to be held securely within its storage and sanitizing case. A recessed opening 36, formed in base surface 22, is covered on both sides by front and back surfaces 18. Recessed opening 36 is disposed to receive a single penlight AA battery, which is used to power the receiver electronics. A projection 38 extends inwardly from one of the front or back surfaces to retain the battery in position while a finger cutout 40 is provided in the other of the front or back surfaces to enable removal of the battery. The useful power of such a battery has been estimated to last for approximately from 4 to 15 hours, depending upon the battery composition, which is a reasonable maximum time for most flights. Therefore, after return of the headset receiver to a flight attendant, the battery is removed and a new battery and earpads 16 are supplied to the next user.

Further recessed openings 42 are provided in side surfaces 26 and are likewise covered on their sides by front and back surfaces 18 and 20. Control knobs 44 are located in openings 42 and are adapted respectively to change the channel and control the volume.

As a result of the flatness of all external surfaces, including the coverage of the recessed openings and the flush fit of cover 28 with surface 18, housing 12 is provided with a smooth exterior which facilitates its easy insertion into its carrying case. To further aid in such insertion, front and back surfaces 18 and 20 are beveled inwardly at lines 46 (see FIG. 2) to provide the housing with a decreasing thickness from lines 46 to the ends of ears 30, which also aids insertion of the housing into its carrying case.

Figure 6:
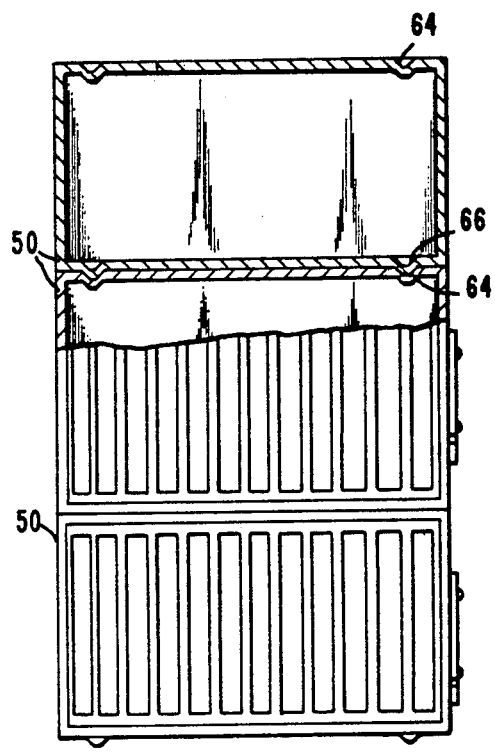
FIG. 6 illustrates a means for stacking a plurality of cases shown in FIG. 3.

Such a carrying case 50 is depicted in FIG. 3. The case has a general box-like configuration with open ends 52 and 54. It includes an outer envelope 56 and an inner envelope 58 secured together. If desired, the envelopes may be separately molded or fabricated and then assembled and adhered together or, if desired, they may be molded as a single piece. Regardless of the method of construction, however, both envelopes have openings 60 therein to provide circulation of air and to lighten the structure. A handle 62 is joined to envelope 56 to enable the case to be carried. As shown also in FIG. 6, depressions 64 in the upper surface and protuberances 66 in the bottom surface of envelope 56 cooperate so that a plurality of cases 50 may be stacked one upon the other. It is to be understood that any other method of stacking may be utilized as desired. It is further understood that the top or bottom portions of envelope 56 may be recessed for reception of handle 62 of the same or adjacent case.

Envelope 56 is open at its ends to provide openings 52 and 54, and envelope 58 is recessed from those ends which provide a peripheral abutment 68 and which defines a specified depth to an entry 70 for receiving a removable construction 72 which is adapted to receive, retain and sanitize a plurality of headsets. Construction 72 includes a first or outer grid plate 74, a second or interior grid plate 76, and a foam element or pad 78 which is disposed to hold a sanitizing fluid. Both grid plates 74 and 76 are provided with a plurality of aligned slots 80, each of which is slightly larger than housing 12. Pad 78 is provided with a plurality of slits 82 which are aligned with slots 80. The external configurations of plates 74 and 76 and pads 78 are sufficient to fit within entry 70 defined by outer envelope 56 but are too large to fit within the adjacent opening of internal envelope 58 so that abutment 68 thereof forms a stop to prevent movement of grid plate 76 further within outer envelope 56. Construction 72 of the grid plates and the element are retained within the outer envelope by a latching mechanism 84, which is better shown in FIGS. 4 and 5.

Figure 4:
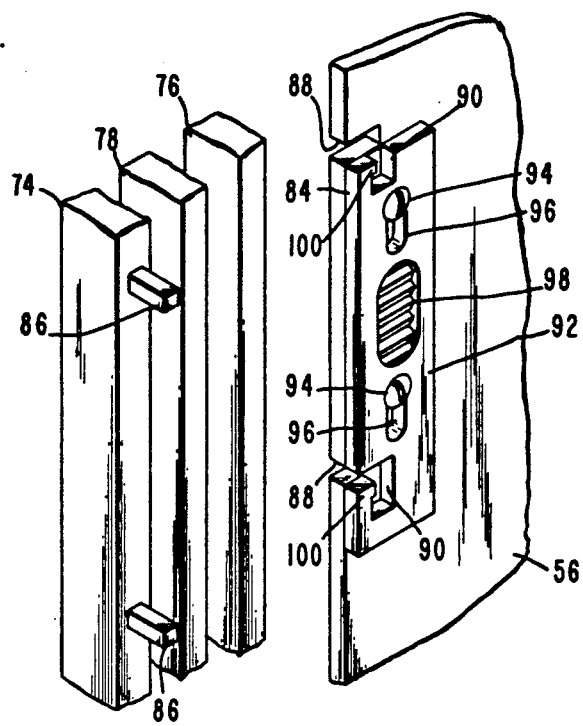
FIGS. 4 and 5 illustrate the latching mechanism respectively in its unlatched and latched conditions which permits change of a sanitizing element.
Figure 5:
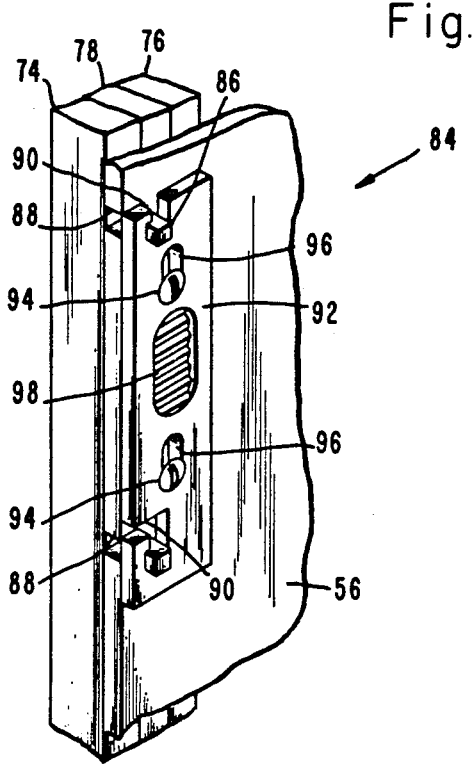

Latch 84 may take any convenient configuration and, as shown, comprises a pair of projections 86 on outer grid plate 74 which are disposed to fit within slots 88 in outer envelope 56 and slots 90 of a movable latch plate 92. The latch plate is affixed to envelope 56 by screws or rivets 94 extending through elongated slots 96 in latch plate 92. Cooperating corrugated surfaces, one of which on envelope 56 is illustrated by indicium 98, prevents inadvertent movement of latch plate 92 with respect to outer envelope 56. Slots 90 within the latch plate are configured to include an interior retainer catch 100 which forms a holding mechanism with projections 86. As shown in FIG. 4, recesses 88 and 90 of envelope 56 and latch plate 92 are aligned to permit projections 86 to be received within both. Thereafter, a movement of the latch plate captures the projection with retainer catch 100 as illustrated in FIG. 5, thereby to secure construction 72, with its inner and outer grid plates and element 78 therein to outer envelope 56.

Referring back to FIG. 3, a further retaining mechanism for holding headset receivers 10 within case 50 includes a plurality of channels 102 which are positioned on the internal surfaces of inner envelope 58. The channels are aligned with slots 80 and slits 82 so that, when the headset receivers are inserted through the slots and slits, guide tabs 34 on the headset receivers engage within their respective channels 102 to retain the headset receivers securely and in parallel within the case, without possibility of entanglement of stems 14 above the various receivers. The channels at openings 52 and 54 may be staggered to facilitate interleaving of the headset acoustical stems when inserted through the opposed openings.

To prevent insertion of the receivers beyond a specified point, at each opening a stop or abutment bar 104 is positioned just inwardly from abutment 68 and is secured to inner envelope 58. Thus, top surface 24 of the headset receiver contacts abutment bar 104 to prevent uncontrolled movement of the headset receiver within case 50.

Accordingly, the thus described headset and headset storage system facilitates the distribution, retrieval, sanitizing and storage of headsets in a unique multi-purpose case. The headsets are sanitized upon passing through the moistened foam element, which is replaceable when deemed necessary by the user after the sanitizing fluid therein is depleted. The headset as configured has a thin electronics module with a flush lens, recessed controls, smooth outer surface, and a beveled upper edge to allow its easy insertion into the sanitizing and storage case. The smooth curvature of the lower case is complemented by preformed acoustical stems which convey the sound to the passenger's ears. Replaceable earpads and a battery assure the passenger of a fresh, clean unit with a highly reliable power source. Such a construction additionally eliminates any problems in the prior art which requires off-loading, laundering, and on-loading, and replaces it with a completely on-board facility.

This construction also permits the acoustical stem to be preformed to provide a wide margin of deflection to accommodate various widths of the user's heads. The upper earpad fittings may be rotated slightly out of plane in a forward direction to provide a more comfortable fit.

Although the invention has been described with reference to a particular embodiment thereof, it should be realized that various changes and modifications may be made therein without departing from the spirit and scope of the invention.

What is claimed is:

1. The combination of a headset receiver and storage system therefor for use in an aircraft passenger entertainment system comprising:
   a housing including means for receiving electromagnetic signals and for converting the electromagnetic signals into audible signals;
   means coupled to said housing for supplying the audible signals to a listener's ears; and
   a case having at least one port for receiving and storing said housing in said case, and sanitizing means positioned adjacent said port for sanitizing said housing and said audible signal supplying means when received in said case.

2. The combination according to claim 1 in which said case has a plurality of said ports and retainers for receiving and retaining an equal plurality of said housings and said audible signal supplying means.

3. The combination according to claim 1 in which said housing is configured generally as a thin parallelepiped having front and rear surfaces joined by edge surfaces, in which said front and rear surfaces are relatively large with respect to said edge surfaces for permitting insertion of said housing at one of said edge surfaces into and through said port.

4. The combination according to claim 3 further including recessed openings in said edge surface for reception of at least one battery and volume and channel controls.

5. The combination according to claim 4 in which said front and rear surfaces have generally rectangular configurations with relatively long base and top edges and relatively short side edges to configure said edge surfaces into relatively thin elongated base and top surfaces and relatively thin short side surfaces, said recessed battery opening extending into said base surface and said recessed control openings extending respectively into said side surfaces.

6. The combination according to claim 5 further including a pair of ears extending from said top surface at its corners with said side surfaces, and a pair of acoustical stems secured to each of said ears for supplying the audible signals to the listener's ears.

7. The combination according to claim 6 in which said housing has a decreasing thickness between said front and rear surfaces from lines thereon spaced from said top surface and extending thereto and to said ear portions for aiding insertion of said housing into said port.

8. The combination of a headset receiver and storage system therefor for use in an aircraft passenger enertainment system comprising:
   a plurality of housings;
   a case having a plurality of ports and holders for receiving at most an equal plurality of said housings;
   each of said housings being configured generally as a thin parallelepiped having front and rear surfaces joined by edge surfaces, in which said front and rear surfaces are relatively large with respect to said edge surfaces for permitting respective insertion of said housings at their edge surfaces through respective ones of said ports, and including means for receiving electromagnetic signals and for converting the electromagnetic signals into audible signals;
   means coupled to each of said housings for supplying the audible signals to a listener's ears; and
   means adjacent said ports for sanitizing said housings and audible signal supplying means upon insertion thereof into said case.

9. The combination according to claim 8 in which said audible signal supplying means includes acoustical stems secured to each of said housings for supplying the audible signals to the listener's ears.

10. The combination according to claim 9 in which said case holders include parallel pairs of channels into which said housings respectively slide and fit for holding said housings respectively within said case, each of said channel pairs being aligned with a respective one of said ports.

11. The combination of headset receivers and a storage system therefor for use by listeners in an aircraft passenger entertainment system comprising:

a plurality of housings, and acoustical stems secured to each of said housings for supplying the audible signals to the listeners' ears;

a case having a plurality of ports and holders for receiving at most an equal plurality of said housings and acoustical means in which said case holders include parallel pairs of channels into which said housings respectively slide and fit for holding said housings respectively within said case, each of said channel pairs being aligned with a respective one of said ports;

means adjacent said ports for sanitizing said holders and said acoustical stems upon insertion thereof into said case; and each of said housings being configured generally as a thin parallelepiped whose front and rear surfaces are relatively large with respect to its edge surfaces, for permitting insertion of each of said housings at one of its edge surfaces through a respective one of said ports, and including means for receiving electromagnetic signals, for converting the electromagnetic signals into audible signals, and for supplying the audible signals through said acoustical stems to a listener's ears.

12. The combination according to claim 1 in which said sanitizing means comprises a pad of foam moistened with a sanitizing fluid, said pad having slits aligned with said ports and said channel pairs.

13. The combination according to claim 12 further including means for removably retaining said sanitizing pad adjacent to said ports and in said case.

14. The combination according to claim 13 in which said removable retaining means comprises at least a first grid plate having said ports therein and including with said case, a cooperating latching mechanism for releasably securing said first grid plate to said case and said sanitizing pad therebetween.

15. The combination according to claim 14 further including stops in said case, and in which said removable retaining means further comprises a second grid plate having said ports and abuttable against said stops, and forming a sandwich construction with said sanitizing pad and said first grid plate, with said sanitizing pad positioned between said first and second grid plates.

16. The combination according to claim 15 further including a stop bar secured to said case and further within said case then said second grid plate, said stop bar extending transversely to said grid ports and said sanitizing pad slits to provide an abutment and to limit reception of said housings within said case, such that said acoustic stems are extendable beyond said stop bar into said case and that said housings are retained within said grid plates and said sanitizing pad.

17. The combination according to claim 16 further including a handle secured to said case to permit it and its contained housings to be hand carried.

18. The combination according to claim 17 further including means on said case for enabling said case to be stacked with like cases.

19. The combination according to claim 16 wherein said case includes a pair of parallel sides between which said channels extend, said sides having therein respective ones of said sandwich construction of said sanitizing pad and said first and second grid plates latchable to said case and said stop bar, for enabling said housings and acoustical stems to be inserted, sanitized and stored in said case at both said sides thereof.

20. A housing for a headset receiver which is adapted to receive electromagnetic signals, to convert the electromagnetic signals into audible signals and to enable supply of the audible signals to a listener's ears, comprising:

an enclosure configured generally as a thin parallelpiped having smooth exterior surfaces including front, rear and edge surfaces, in which said front and rear surfaces are relatively large with respect to said edge surfaces and have generally rectangular configurations with relatively long base and top edges and relatively short side edges to configure said edge surfaces into relatively thin elongated base and top surfaces and relatively thin short side surfaces; and recessed openings formed by recesses in said edge surfaces and by portions of said front and rear surfaces overlapping the recesses for receiving and enclosing at least one battery and for enclosing control knobs to enhance the smoothness of said exterior surfaces by reducing the number of exterior discontinuities, said recessed battery opening extending into said base surface and said recessed control knob openings extending respectively into said side surfaces.

21. A housing according to claim 20 further including a pair of ears extending from said top surface at its corners with said side surfaces, and a pair of acoustical stems secured to each of said ears for supplying the audible signals to the listener's ears.

22. A housing according to claim 20 further including at least one cutout in said front and rear surfaces adjacent said battery recessed opening to facilitate removal of a battery therefrom.

23. A housing according to claim 21 in which said housing has a decreasing thickness between said front and rear surfaces from lines thereon spaced from said top surface and extending thereto and to said ear portions for aiding insertion of said housing into a carrying case.

24. A housing according to claim 21 further including a pair of guide tabs extending outwardly sideways respectively from said ears.

25. A housing according to claim 20 further including electromagnetic signal detection means within said enclosure, and a cover over said electromagnetic signal detection means forming a part of at least one of said front and rear surfaces and being flush therewih to enhance the smoothness of said exterior surfaces.

26. A method for enabling a headset receiver to be reused by a pluraliy of listeners, comprising the steps of:
providing a case with sanitizing and storing facilities;
retaining the receiver generally in fixed position in the case; and
sanitizing the receiver while being retained and stored in the case when the receiver is not in use.

27. A method according to claim 26 for enabling a plurality of such headset receivers to be reused, further comprising the step of providing the case with a plurality of sanitizing and storing facilities for each of the receivers and in which said sanitizing while retained and stored step further comprises the step of sanitizing the receivers while being stored respectively in individual ones of the facilities within the case.

* * * * *